United States Patent [19]

Kikuchi

[11] Patent Number: 5,261,508

[45] Date of Patent: Nov. 16, 1993

[54] VISUAL WEAR INDICATOR FOR A DISC BRAKE

[75] Inventor: Kingo Kikuchi, Saitama, Japan

[73] Assignee: Akebono Brake Industry Co., Ltd., Tokyo, Japan

[21] Appl. No.: 869,304

[22] Filed: Apr. 17, 1992

[30] Foreign Application Priority Data

May 22, 1991 [JP] Japan .................. 3-45499[U]

[51] Int. Cl.⁵ .................. F16D 66/02; F16D 65/097
[52] U.S. Cl. .................. 188/1.11; 188/73.38; 192/30 W; 116/208
[58] Field of Search ............ 188/1.11, 73.31, 73.37, 188/73.38, 79.51; 192/30 V, 30 W; 116/208

[56] References Cited

U.S. PATENT DOCUMENTS

| | | | |
|---|---|---|---|
| 3,450,234 | 6/1989 | Takata | 188/73.31 |
| 4,311,214 | 1/1982 | Haraikawa et al. | 188/1.11 |
| 4,506,767 | 3/1985 | Inoue et al. | 188/73.38 |

FOREIGN PATENT DOCUMENTS 0113759 9/1979 Japan .................. 188/1.11
2017237 10/1979 United Kingdom .

Primary Examiner—Robert J. Oberleitner
Assistant Examiner—Josie A. Ballato
Attorney, Agent, or Firm—Cushman, Darby & Cushman

[57] ABSTRACT

A clip-type wear indicator suitable for use with a disk brake. The disk brake includes a rotor, a pair of slidable friction pads located on opposite sides of the rotor, the friction pads including a lining and a backing plate attached thereto and extending radially therefrom, a stationary support member radially spaced from the rotor and having a mating guide, and a caliper adjacent to the backing plates for urging the linings against the rotor. The clip is secured to the stationary support member when the upper, lower, left and right suppressing pieces are brought into elastic engagement with the mating guide on the stationary support member. The upper suppressing piece has a notch that is positioned so that when the caliper urges the lining against the rotor and edge of at least one of the backing plates is aligned with the notch when the lining is worn to such an extent that the friction pads should be replaced.

6 Claims, 4 Drawing Sheets

VISUAL WEAR INDICATOR FOR A DISC BRAKE

BACKGROUND OF THE INVENTION

1. Field of the Invention

The present invention relates to a wear indicator for a disc brake. The invention relates to a visible wear indicator that indicates that the friction pads have worn to such an extent that they should be replaced.

2. Related Art

FIG. 10 depicts the prior art for a conventional disc brake. The disc 3 brake has a rotor 101 rotating in association with vehicle wheels and friction pads $102_1$, $102_2$. The friction pads $102_1$ and $102_2$ are urged against the rotor 101 to brake the rotor 101. The frictional force of a lining $102a_1$, $102a_2$ of the friction pads $102_1$, $102_2$ towards the rotor 101, brakes the vehicle through the rotor 101.

More specifically, both the friction pads $102_1$ and $102_2$ are guided by a support member 103 secured to the vehicle body The friction pads $101_1$ and $102_2$ disposed between a protrusion 104a of a caliper 104 and a piston 104b which is applied with a hydraulic pressure generated in a cylinder formed on the caliper 104. When a backing plate $102b_1$ of one of the friction pad $102_1$ is urged by the piston 104b, the other backing plate $102b_2$ of the friction pad $102_2$ is also urged against the rotor 101 by the protrusion 104a of the caliper 104, so that the braking operation is performed.

The slidable backing plates 102b of the friction pads 102 are supported rotor by the support member 103 in such a manner that a groove formed on the backing plates 102b is engaged with a protruding guide portion 103a formed on the support member 103.

In the prior art, the guide portion 103a of the support member 103 is prevented from being worn out by a clip member which is fitted on the guide portion 103a of the support member 103 and disposed between the guide portion 103a and the backing plate 102b. There are several known and types of the structures of the groove and guide member depending upon design of the disc brake.

The linings 102a of the friction pad 102 are worn out due to repeated braking operations. Before the lining 102a of the friction pad 102 has worn away completely, the pad is replaced by a new one since the contact of the backing plate directly to the rotor may cause serious problems.

There has been several types of conventional wear indicator apparatus for automatically alarming the condition of non-allowable wear amount of the lining. For example, U.S. Pat. No. 4,037,689 discloses one example of the conventional apparatus in which an end of an elastic piece is fixed to a backing plate of a pad while the other end of the elastic piece extends toward the rotor. The extending end of the elastic piece comes into contact to the rotating rotor when the lining is worn out to such an extent that the pad should be replaced. This contact vibrates the apparatus which in turn generate a noise alarm.

In the other conventional apparatus, a window is formed on a top portion of the caliper permitting visual observation of the lining through the window.

FIG. 11 is a perspective view showing a second type of conventional wear indicator. In this indicator, a step down portion 113a is formed on a sliding surface of a pad of the support member 113. When the lining is worn out to and should be replaced, such a condition becomes apparent from a positional relation between the step down portion 113a and the backing plate.

However, in the conventional wear indicator apparatus having the elastic piece fitted on the backing plate of the friction pad, the number of parts increase making the assembly process complicated. Further, the alarm sound would not have a sufficient high volume, which may cause problems.

Further, the second conventional apparatus having the window, it is difficult to visually observe the pad thickness the window cannot be made sufficiently large because the structural integrity of the caliper would be seriously compromised. Thus the inside of the caliper is dark making it hard to observe the pads clearly.

Furthermore, in the other wear indicator structure as shown in FIG. 11, it is necessary to form the step down portion on the support member 113 which causes assembling process to be complicated.

SUMMARY OF THE INVENTION

The present invention was made in view of the foregoing difficulties and problems accompanying the conventional wear indicator apparatus.

Therefore, it is an object of the invention to provide a wear indicator for a disc brake that visually indicates that the friction pads have worn to such an extent that they should be replaced.

Another object of the invention is to provide a wear indicator that simple in structure and small in number of assembling parts.

The above and Other objects can be achieved by providing a wear indicator in which, according to the present invention, a notch is formed on an upper suppressing piece extending from a clip which covers a guide portion of a support member for supporting the slide movement of a backing plate of a friction pad in a radial direction of a rotor. The width of the notch is set to be an amount that an edge of the notch comes to be aligned with a surface of the backing plate when the lining of friction pad is worn away to a non-allowable extent.

The clip is elastically fitted on the guide portion of the support member engaged with the backing plate of the friction pad for guiding the backing plate to slide toward the rotor, so that the clip is disposed between the pair of backing plates and the guide portion to thereby prevent the support member from being worn out.

Since the width of the notch is set to be such an amount that an edge of the notch comes to be aligned with a surface of the backing plate when the lining of friction pad is worn away to such an extent that it should be replaced, the positional relation between the backing plate and the notch can easily and clearly be observed. The top of the brake between the caliper and support member is viewable under a bright condition. Therefore, the vehicle operator can determine when the friction pad must be replaced by a new one.

DESCRIPTION OF THE PREFERRED EMBODIMENTS

Figure 1:
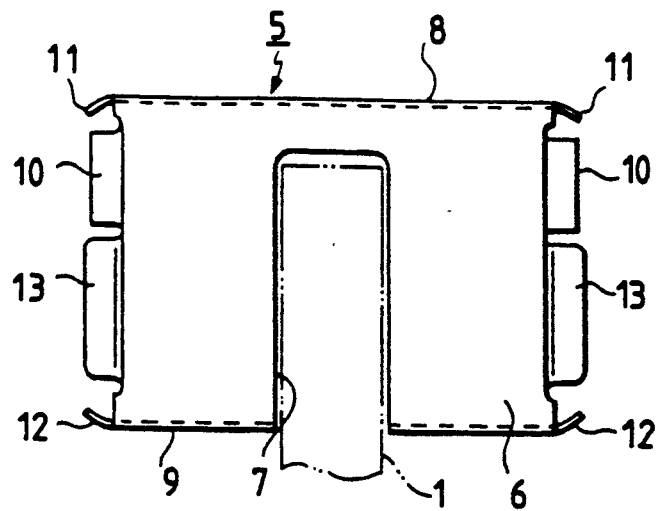
FIG. 1 is a front view of a clip of the invention.

Preferred embodiments of the present invention will now be described with reference to the accompanying drawings.

FIGS. 1 to 8 show a first embodiment of the present invention. A clip 5 shown in FIGS. 1-4 is provided with a main part 6, an opening 7 formed at a center portion of the main part 6 for passing a rotor 1 therethrough, an upper suppressing piece 8, a lower suppressing piece 9 and side suppressing pieces 10, 10 which are formed at the top, bottom, left and right edges of the clip, respectively, by bending rearwardly. These suppressing pieces elastically fit on a mating guide 3a of the support member to thereby make the clip 5 unmovable when the clip 5 is mounted on the guide 3a of the support member. The upper and lower suppressing pieces 8, 9 as well as short pieces 11, 12, 13 extending sideward from the main part 6 and bent perform as guide pieces when the clip 5 is mounted on the support member.

Figure 2:
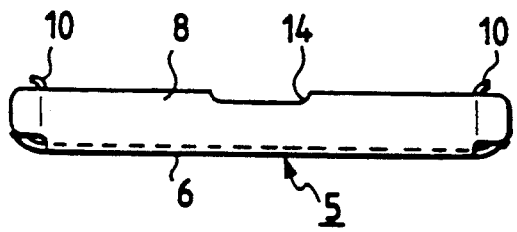
FIG. 2 is a top view of the clip shown in FIG. 1.
Figure 3:
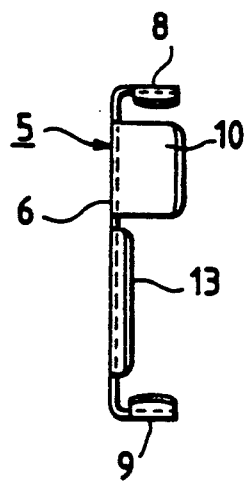
FIG. 3 is a side view of the clip.
Figure 4:
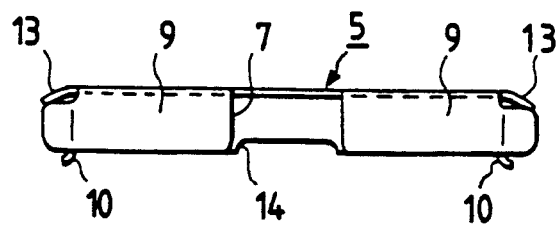
FIG. 4 is a bottom view of the clip.
Figure 5:
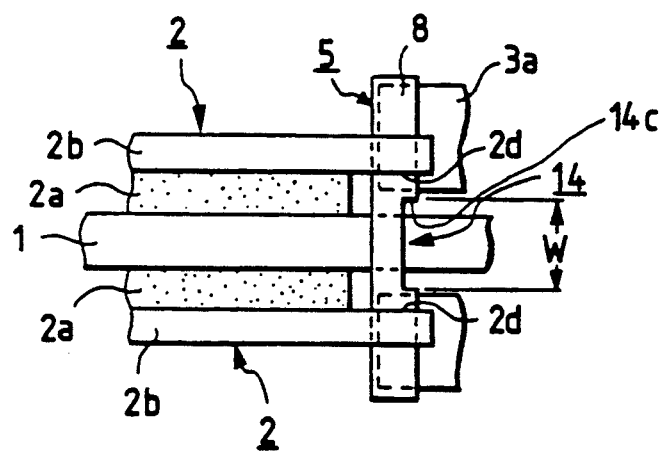
FIG. 5 shows a positional relation between the notch and backing plate when the lining is not worn away.
Figure 6:
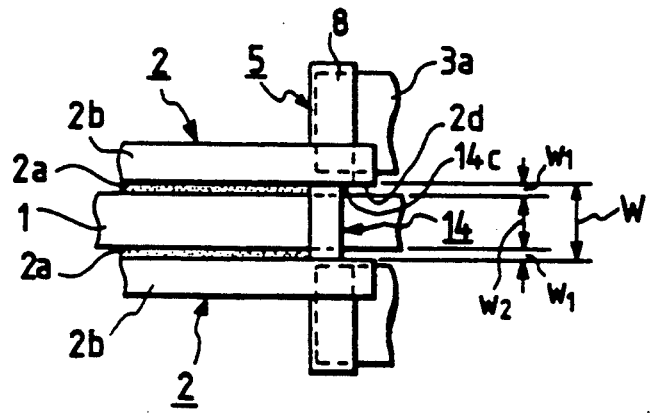
FIG. 6 shows a positional relation between the notch and backing plate when the lining has been worn away.
Figure 7:
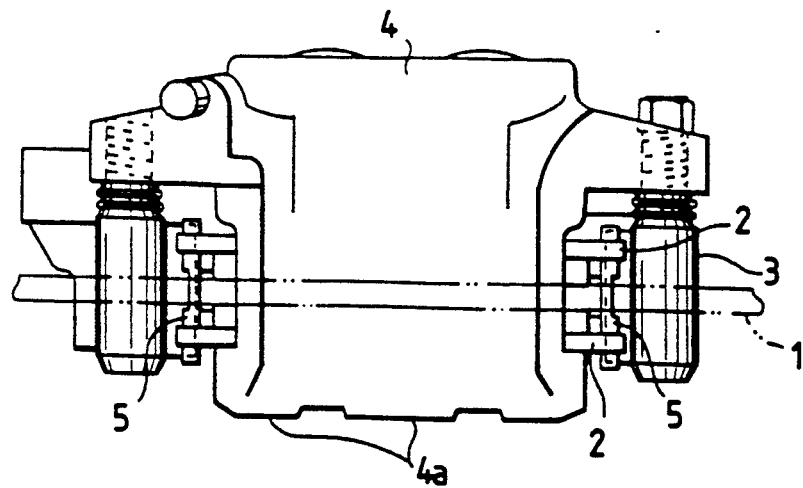
FIG. 7 is a top view showing a disc brake to which the clip of the invention is mounted.
Figure 8:
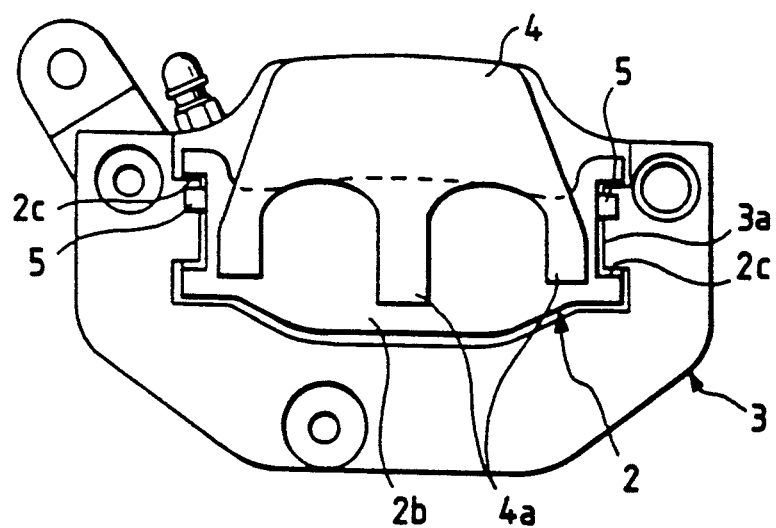
FIG. 8 is a front view of the disc brake shown in FIG. 7.

The upper suppressing piece 8 is provided with a notch 14 at one edge thereof opposite the main part 6 as shown in FIG. 2. The width of the notch 14 in the radial direction of a rotor 1 is determined so that an inner surface 2d of a backing plate 2b is spaced apart from a side edge 14c of the notch 14 when the lining 2a of the friction pad 2 is not worn out as shown in FIG. 5, whereas the inner surface 2d is aligned with the side edge 14c when the lining 2a has worn away to such an extent that such wear is no longer allowable as shown in FIG. 6. That is, the width of the notch 14 is set to satisfy an equation $$W = 2w_1 + w_2$$

where W is the width of the notch 14, $w_1$ represents a remained thickness of the lining 2a when the lining has worn away to such an extent that such wear is no longer allowable and $w_2$ represents a thickness of the rotor 1.

Since the upper suppressing piece 8 of the clip 5, edge of the pad 2 and the rotor 1 can be viewed clearly from an opening part defined between the caliper and support member of the disc brake, it can clearly and easily be observed that the lining has worn away to such an extent that such wear is no longer allowable or the lining has worn out almost to a critical non-allowable extent. Therefore, one can know an appropriate time when the pad must be replaced by a new one.

Figure 9:
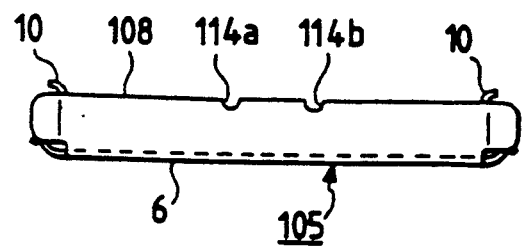
FIG. 9 is a top view showing an upper suppressing piece according to the second embodiment of the invention.
Figure 10:
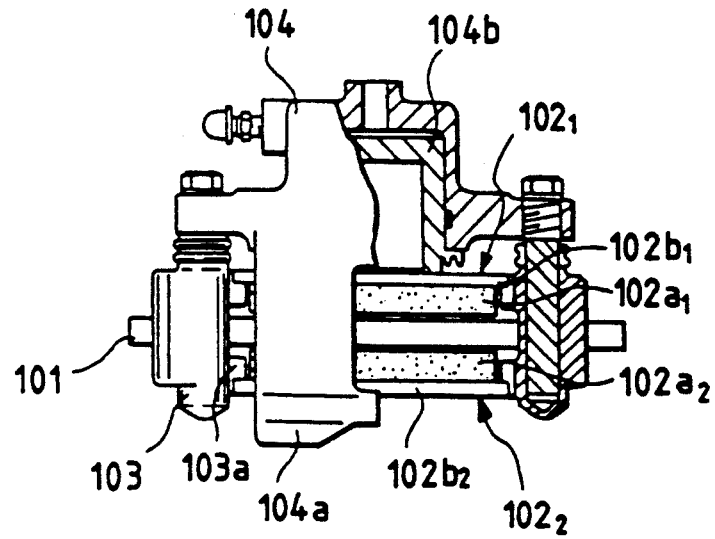
FIG. 10 is a brief sectional view showing a conventional disc brake apparatus.
Figure 11:
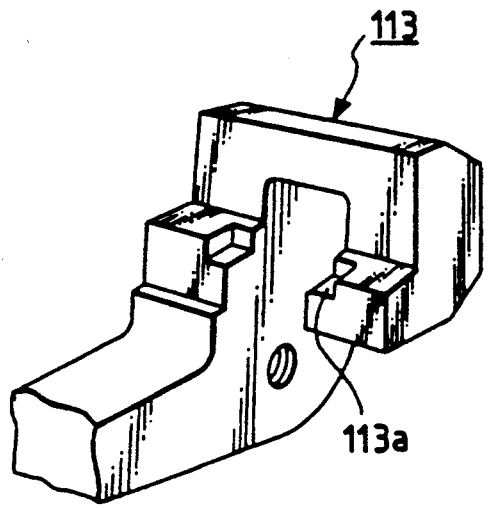
FIG. 11 is a perspective view showing another type of conventional wear indicator.

FIG. 9 is a top view showing an upper suppressing piece 108 according to the second embodiment of the invention. In this embodiment, a clip 105 is provided with a pair of small notches 114a and 114b in place of the single large notch 14 of the first embodiment, so that each of the backing plates of the friction pads can be observed and checked independently and separately by the respective notches 114a and 114b. That is, the inner surface of the backing plate of an inner friction pad and that of an outer friction pad can be checked with the inner notch 14a and outer notch 14b, respectively, and therefore the worn-out condition of each of the pads can be observed separately and independently.

According to the first and second embodiments of the invention described above, the worn-out condition of the lining of the pad is observed by the positional relation between the inner surface of the backing plate of the pad and the edge of the notch formed on the upper suppressing piece. However, the invention is not limited thereto or thereby. That is, the other arrangement of a clip by which, for example, the pad is observed by the positional relation between an outer surface of the backing plate and an edge of the notch may be applied.

As described above, since the wear indicator according to the present invention is provided with a clip mounted between the friction pad and the support member for improving a slidability of the pad and for preventing the support member from being worn out and the notch formed on the clip, the number of parts to be assembled is small and the indicator can be designed to be simple in structure compared to the conventional wear indicator apparatus in which a clip is separately disposed. Further, the wear indicator of the invention has an advantage that the worn-out condition can clearly and easily be observed by eyes under bright conditions.

I claim:

1. A clip-type wear indicator suitable for use with a disc brake, said disc brake including a rotor, a pair of slideable friction pads located on opposite sides of the rotor, said friction pads including a lining and a backing plate attached thereto and extending radially therefrom, a stationary support member radially spaced from the rotor and having a mating guide, and a caliper adjacent to said backing plates for urging the linings against the rotor, said wear indicator comprising:

a main part having an opening suitable for passing a rotor therethrough and having an upper edge, lower edge, right edge, and a left edge;

an upper suppressing piece attached to said upper edge and bent outward relative to the friction pads, said upper suppressing piece having a visual indicating means for visually indicating when the lining is worn away to such an extent that the friction pads should be replaced; and a lower, a right, and a left suppressing piece each attached to its respective edge and each being bent outward relative to the friction pads;

said wear indicator being securable to the stationary support member when said upper, lower, left and right suppressing pieces are brought into elastic engagement with the mating guide, said wear indicator being positionable so that when the caliper urges the lining against the rotor an edge of at least one of the backing plates is aligned with said indicating means when the lining is worn to such an extent that the friction pads should be replaced.

2. The wear indicator of claim 1, wherein said indicating means comprises a notch means.

3. The wear indicator of claim 2, wherein said notch means comprises a single notch.

4. The wear indicator of claim 2, wherein said notch means comprises two notches.

5. The wear indicator of claim 1, wherein:

said main part further comprises a left and a right short piece attached to said left edge and said right edge respectively and bent rearwardly therefrom for guiding said wear indicator onto the mating guide.

6. The wear indicator of claim 5, wherein:

said upper suppressing piece has at least one short piece attached thereto and bent outward relative to the friction pads for guiding said wear indicator onto the mating guide; and said lower suppressing piece has at least one short piece attached thereto and bent outward relative to the friction pads for guiding said wear indicator onto the mating guide.

* * * * *